May 15, 1934.  M. C. REYNOLDS ET AL  1,958,975
MARGARINE PROCESS
Filed April 12, 1929
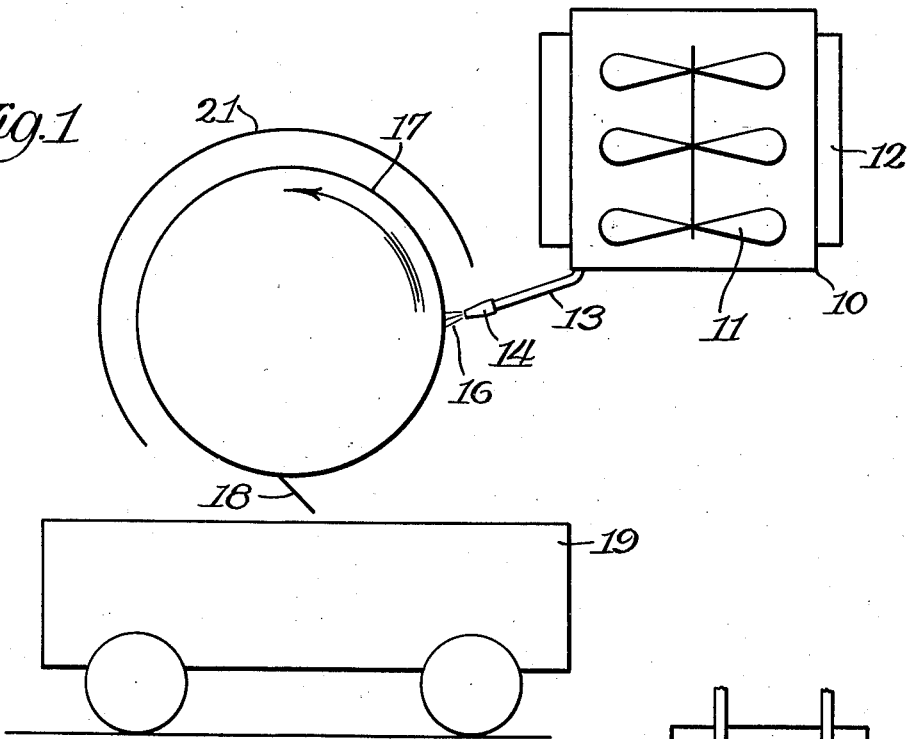
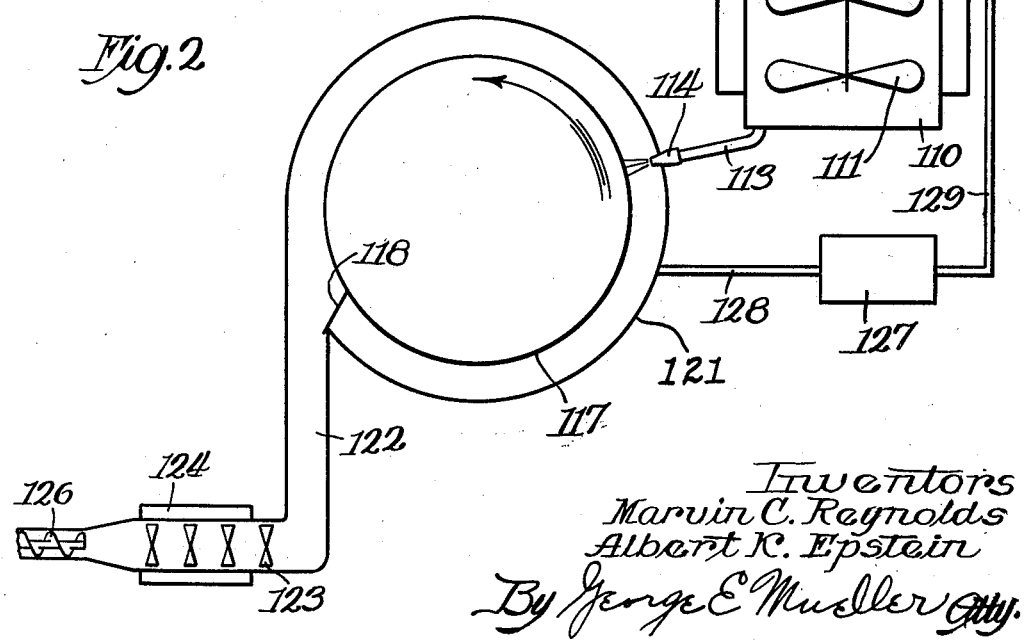
Inventors
Marvin C. Reynolds
Albert K. Epstein
By George E. Mueller Atty.

Patented May 15, 1934

1,958,975

UNITED STATES PATENT OFFICE 1,958,975

MARGARINE PROCESS

Marvin C. Reynolds and Albert K. Epstein, Chicago, Ill.

Application April 12, 1929, Serial No. 354,498

3 Claims. (Cl. 99—13)

Our invention relates in general to an improved process for producing margarine, by means of which we overcome many well known difficulties and obtain a greatly improved product.

Briefly, and speaking generally, margarine is made by mixing or compounding selected fatty substances at liquid temperatures, and a suitable aqueous liquid, generally cultured milk or water, and treating the mixture to form an emulsion wherein the aqueous liquid and water soluble substances constitute the disperse phase and the associated fatty substances constitute the continuous phase. This emulsified intermediate product is then chilled, with the result that the emulsion is stabilized and a homogeneous solid final product obtained.

Assuming that the constituents have been properly selected and treated, one of the most important steps in the process for producing margarine is cooling the liquid emulsion to reduce it to solid form. This must be done rapidly and uniformly, in order to obtain the proper texture in the finished product, and for several very important reasons which will be pointed out more in detail hereinafter. The principal problem is to get a very rapid and instantaneous cooling at a uniform rapid rate for every portion of the emulsion. This is particularly true with the more recent margarine developments wherein fatty substances, such as cocoanut oil and similar fatty substances, are used.

The means employed for cooling are various in various processes, but, in general, the development has been as follows:

Originally the wet process was developed by which means the liquid emulsion was allowed to flow in a form of stream into a body of cold liquid such as water, or a stream of cold water was allowed to project upon the flowing stream of the margarine emulsion. The emulsion became congealed into aggregate masses. The second process for cooling is what is known as the dry process wherein the liquid margarine emulsion was spread in a layer on a refrigerated surface such as metallic rolls and allowed to congeal and then was removed from such surface by scraping or other suitable means. Greater uniformity in the chilling obtained in the wet process was improved by M. C. Reynolds United States Patent 1,507,426 where fractional crystallization is prevented and other beneficial results are obtained. Heretofore there have been slight imperfections in both the wet and dry processes, and we now propose, and have developed, a specifically new process whereby all of the advantages of the old processes are obtained, with none of the disadvantages.

Accordingly our object was to produce an improved margarine process obtaining a better product.

Another object was to produce margarine more economically.

Another object is the provision of a process for producing margarine which will lend itself to continuous operation.

Another object is to produce a margarine containing only dispersed moisture introduced during the emulsification and without adhering and interlacing moisture derived from the wet chilling process.

We are aware that margarine has been applied to the outside surface of continuously rotating refrigerated drums in the form of a sheet, and removed by scraping when solidified. All methods heretofore used for applying the liquid margarine were inefficient and objectionable, principally because the source of supply near the drum (which, of necessity, must be quite cold) congeals and causes great difficulties in process control and furthermore relatively thick layers are produced on the surface of the drums which do not solidify rapidly or instantaneously but congeal gradually. Accordingly, a specific object is to remedy this condition.

Briefly, we obtain the objects of our invention by producing a suitable liquid emulsion by subdividing or spraying the liquid emulsion onto a rotating refrigerated surface of a material having high thermal conductivity, so that the individual discrete particles of the emulsion are instantly solidified, removing the particles from the surface and finally tempering them, salting them if desired and molding them to suitable marketable form.

Other objects and features of the invention will be apparent from a consideration of the following detailed description taken with the accompanying drawing, wherein—

Fig. 1 is a schematic or diagrammatic representation of one form of mechanism which might be employed in carrying out our improved process; and Fig. 2 shows an arrangement for a continuous operation of the process.

In order to disclose to those skilled in the art the principal details of our invention, so that they will be able to practice the same, we shall refer to the specific steps employed in carrying out our process, as modified by the use of apparatus as suggested in the drawing. The first step is in the production of the emulsion, which is done by supplying suitable materials to a churn 10 (Fig. 1) provided with suitable beaters 11 and wherein the temperature is controlled by suitable temperature regulating means 12, which may be resistance windings or other heating or cooling means such as steam and cold water. In the preferred form, the churn would be of a progressive type wherein the unmixed ingredients can be fed to the top thereof and the thoroughly emulsified product delivered at the bottom. The liquid emulsion is delivered by means of a suitable pressure pump (not shown) through a supply pipe 13 under sufficient pressure to a flat spray nozzle 14 to produce a spray 16 which is directed with force against the surface of a revolving refrigerated roller or drum 17. At a suitable location, a scraper 18 is provided for continuously removing the solidified sprayed particles from the refrigerated roller where they fall by gravity into a suitable cart or wagon 19, after which they are subjected to further treatment, including generally tempering, salting and molding. To conserve refrigerant, the roller may be protected by a casing 21, this structure not being shown in detail, since the present invention is not primarily concerned therewith. Any suitable convenient means besides pressure and nozzles may be used to atomize, spray or subdivide the liquid emulsion into particles before they impinge on the cold moving metallic surface.

This represents briefly the principal details of our improved process, the step of subdividing the liquid flowing emulsion into small particles and having said particles impinge against the refrigerated drum surface while in rotation resulting in a substantially instantaneous or quasi instantaneous solidification of the margarine particles. The temperature at which the drum is maintained may vary greatly, depending upon the specific characteristics of the margarine emulsion which is being employed, but it should be sufficiently cold to obtain very rapid instantaneous cooling to a sufficiently low temperature to obtain the result desired. For use with many standard present day margarine products, a temperature of approximately zero degrees Fahrenheit to five degrees Fahrenheit is used, but with our process a higher temperature may be used if desired.

Fig. 2 shows one manner in which our invention may be carried out in a continuous sequence of operations and accurate process control obtained at all stages of the manufacture.

We shall first refer briefly to the apparatus which is illustrated schematically and which comprises a drum 110, beaters 111, transfer pipe 113 and spray nozzle 114, projecting through an airtight casing 121 and adapted for discharge against a continuously rotated refrigerated roller 117. A scraper 118 is provided for removing the solidified substance from the drum or roller, and this part of the apparatus is substantially the same as that shown in Fig. 1. The casing 121, however, is made air-tight so as to make it possible to operate the spray entirely under a vacuum and so avoid the possibility of entrapping oxygen mechanically as the process is carried on. In the arrangement shown, the scraper is so disposed with respect to the casing, that the removed solid particles will fall by gravity into a delivery chute 122, where they are progressed along the horizontal delivery pipe by paddles 123, while at the same time heat is applied thereto through a resistance 124. The delivery passageway is gradually reduced in cross-section and is provided with suitable extrusion means, such as a screw 126, so that the finished product may be delivered in proper molded form from the delivery pipe.

Any suitable type of air pump 127 is provided with the suction line 128 connected into the casing 121 and the pressure side of the pump 129 connected above the churn, or above a second or storage receptacle (not shown) into which the contents of the churn may be discharged. This has the effect of placing sufficient pressure behind the liquid to operate the spray 114.

Now, to explain the process as carried out, suitable substances in proper proportions and in proper form are supplied to the churn at the proper rate and processed until the proper emulsion is formed. The liquid emulsion in a flowing condition is delivered under pressure to the spray nozzle or orifice (in actual practice, a number of nozzles or orifices, of course, are employed) and sprayed against the refrigerated roller 117. As the solidified substance is scraped from the roller, it falls to the bottom of the delivery pipe 122 by gravity, the vacuum being insufficient to overcome the force of gravity and interfere with the proper movement of the solid substance. The material, as removed, when it comes in contact with the paddles 123, is readily agitated and moved forward, where it gradually is raised to a sufficient temperature to make the individual small pieces coalesce under pressure to form a buttery like substance. Continued forward movement and working has the effect of plasticizing and kneading the solid matter and finally, when delivered to the screw 126, a plastic, moldable substance is present. The narrow cross-section of the delivery line at this point prevents the vacuum at the other end from having any appreciable effect on the delivery of the finished margarine. Salt and other materials may be added during the kneading.

In place of a partial vacuum, the margarine may be sprayed into an atmosphere of an inert gas such as carbon dioxide or any other atmosphere substantially free of oxygen, or an atmosphere having an oxygen pressure less than that in air at one atmosphere.

One of the principal advantages of our invention, whether applied to continuous operation, or not, is the avoiding of pre-chilling of the margarine as it is applied to the roller. The margarine can be supplied directly to the surface of the roller at substantially the same temperature at which it is maintained in the churn, and accordingly perfect control, exact duplication of conditions, etc., can be obtained at all times.

While we have described many details of our invention to enable those skilled in the art to practice the same, we do not necessarily limit ourselves to the details of the process as disclosed, the invention being limited only by the scope of the appended claims.

We do not limit our invention to the use of a spray nozzle or nozzles to subdivide the liquid emulsion. This can also be accomplished by any other suitable means such as forcing the liquid emulsion into a pipe with small openings or orifices whereby a pressure is built up and the emulsion leaves the orifice in finely divided form.

What we claim as new and wish to protect by Letters Patent of the United States is:

1. The method of making margarine which comprises forming a liquid emulsion of oleaginous material and aqueous material, forcing the liquid emulsion through a flat spray nozzle to produce a flat, finely divided spray of liquid emulsion particles, projecting the flat spray onto a rotating refrigerated drum whereby to apply substantially only a single layer of the emulsion to the drum and solidify the emulsion on the drum without fractional crystallization, and scraping the solidified emulsion from the drum.

2. The method of making margarine which comprises forming a liquid emulsion of oleaginous material and aqueous material, forcing the liquid emulsion through a flat spray nozzle to produce a flat finely divided spray of liquid emulsion particles, projecting the flat spray onto a rotating refrigerated drum in an atmosphere having an oxygen pressure substantially less than air at one atmosphere whereby to apply substantially only a single layer of the emulsion to the drum and solidify the emulsion on the drum without fractional crystallization, and scraping the solidified emulsion from the drum.

3. The method of making margarine, which comprises forming a liquid emulsion of oleaginous material and aqueous material, subdividing the liquid emulsion by the application of force through an orifice to form a relatively flat spray of finely divided emulsion, projecting the flat spray onto a rotating refrigerated drum whereby to apply substantially only a single layer of the emulsion to the drum and solidify said emulsion without appreciable fractional crystallization, and scraping the solidified emulsion from the drum.

MARVIN C. REYNOLDS.
ALBERT K. EPSTEIN.